United States Patent [19]

Rinio

[11] Patent Number: 4,736,832

[45] Date of Patent: Apr. 12, 1988

[54] FLAT LINK CHAIN BUCKET CONVEYOR

[75] Inventor: Wolfgang Rinio, Kamp-Lintfort, Fed. Rep. of Germany

[73] Assignee: Aumund-Fordererbau GmbH Maschinenfabrik, Rheinberg, Fed. Rep. of Germany

[21] Appl. No.: 71,589

[22] Filed: Jul. 8, 1987

Related U.S. Application Data

[63] Continuation of Ser. No. 782,627, Oct. 1, 1985, abandoned.

[30] Foreign Application Priority Data

Jan. 31, 1985 [DE] Fed. Rep. of Germany ....... 3503302

[51] Int. Cl.⁴ .............................................. B65G 17/36
[52] U.S. Cl. ..................................... 198/712; 198/713
[58] Field of Search ................................. 198/712, 713

[56] References Cited

U.S. PATENT DOCUMENTS

| | | | |
|---|---|---|---|
| 620,240 | 2/1899 | Holmboe | 198/712 X |
| 640,762 | 1/1900 | Gray | 198/712 X |
| 1,111,823 | 9/1914 | Coldren | 198/712 |
| 2,022,300 | 11/1935 | Shaw | 198/712 X |
| 2,444,812 | 7/1948 | Crowley, Jr. et al. | 198/712 |
| 3,010,334 | 11/1961 | Bansemer | 198/712 |
| 3,462,003 | 8/1969 | Mencacci et al. | 198/712 |
| 3,659,698 | 5/1972 | Rieger | 198/712 |
| 3,676,675 | 7/1972 | Ransohoff et al. | 198/712 X |
| 4,129,209 | 12/1978 | Mayfeld | 198/712 |
| 4,177,891 | 12/1979 | Delfosse | 198/712 X |

FOREIGN PATENT DOCUMENTS

| | | | |
|---|---|---|---|
| 962059 | 4/1957 | Austria | 198/712 |
| 231892 | 2/1964 | Austria . | |
| 248238 | 6/1912 | Fed. Rep. of Germany . | |
| 1000283 | 1/1957 | Fed. Rep. of Germany | 198/712 |
| 1949666 | 8/1966 | Fed. Rep. of Germany . | |
| 42168 | 2/1988 | Fed. Rep. of Germany . | |
| 531130 | 1/1922 | France . | |
| 1409731 | 7/1965 | France | 198/712 |
| 59-64405 | 4/1984 | Japan | 198/712 |
| 6405198 | 11/1964 | Netherlands | 198/712 |
| 755698 | 8/1980 | U.S.S.R. | 198/712 |

Primary Examiner—Robert J. Spar
Assistant Examiner—Cheryl L. Gastineau
Attorney, Agent, or Firm—Armstrong, Nikaido, Marmelstein & Kubovcik

[57] ABSTRACT

In a flat link chain bucket conveyor constructed in particular as high-speed conveyor with centrifugal discharging, the buckets (4) are mounted with clearance on the chain (2), in particular on the link pins (3), in such a manner that they are freely movable relatively to the chain under the influence of the forces acting on the buckets within the scope of the existing play. As a result the transmission of shocks and vibrations from the chain to the buckets is very greatly reduced and thus crack formation occurring in the prior art in particular at the bucket securing points is avoided or greatly diminished.

12 Claims, 4 Drawing Sheets

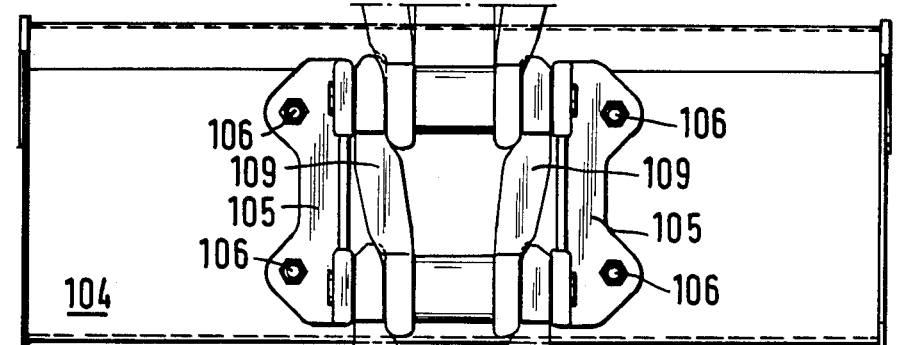
Fig.2
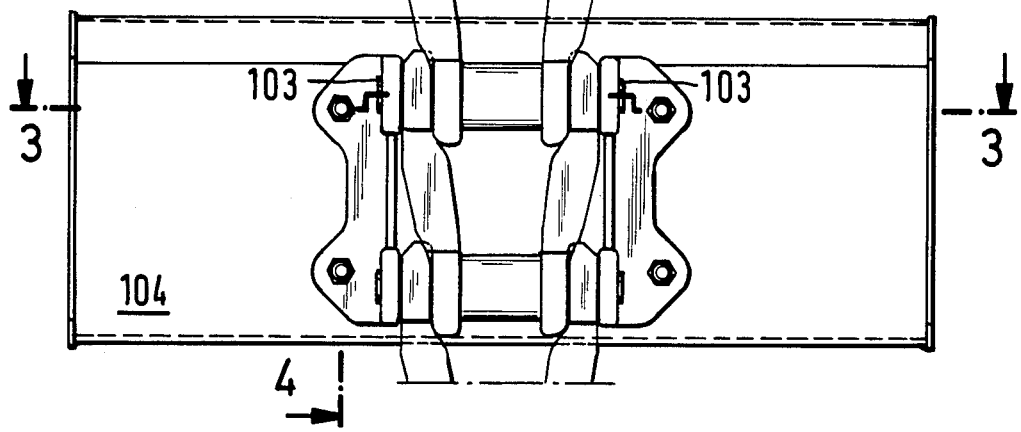
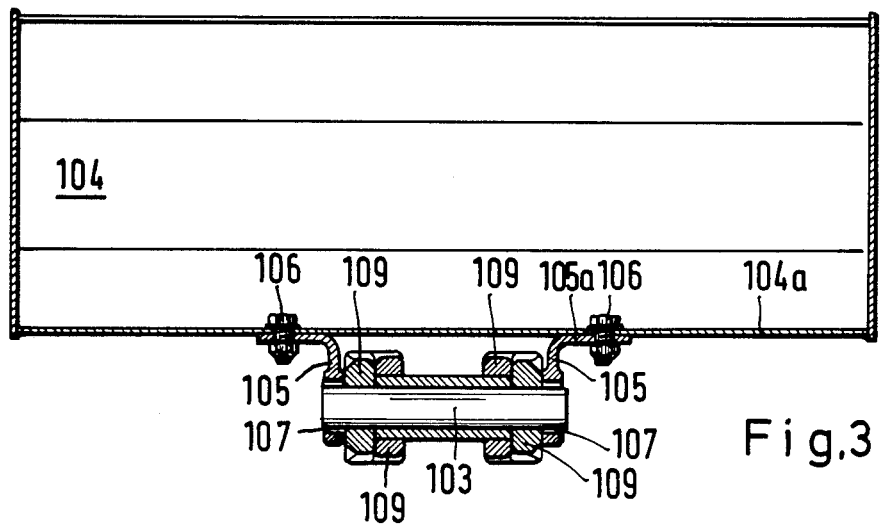
Fig.3

FLAT LINK CHAIN BUCKET CONVEYOR

This application is a continuation of application Ser. No. 782,627 filed Oct. 1, 1985, now abandoned.

BACKGROUND OF THE INVENTION

The invention relates to a flat link chain bucket conveyor which is constructed in particular as high-speed conveyor with centrifugal discharging, comprising a flat link chain and buckets secured to the flat link chain. The invention relates in particular to a novel securing of the buckets to the flat link chains.

It is known in the art to provide chain link plates with flanged or forged-on angle members for screwing on the buckets, cf. the "Special publication from Zement, Kalk, Gips", volume 26, 1974, no. 4, pages 176 to 181: "Vertical bucket elevators for hot material", published in the Bauverlag, Wiesbaden. According to a further embodiment it is known with a forged link plate form to provide bores at reinforced points via which the buckets are directly screwed to the link plate. In all known cases the bucket is fixedly screwed to the flat link chain. Usually, the screwing is even carried out with bracing means because the buckets themselves are rough welded members without machined securing faces. Due to the rigid connection all the shocks and vibrations transmitted to the chain are consequently further transmitted to the buckets or cups as well. As a result, a tearing of the bucket rear walls occurs very rapidly, this starting from the bores of the securing screws. Furthermore, the rear or front upper corners of the buckets are also very much endangered.

The cause of these impacts resides in particular in the polygon effect of the chain drive wheels which produces longitudinal oscillations in the chain (see "Special publication from Zement, Kalk, Gips", 27th volume, November 74, published in Bauverlag, Wiesbaden "Shuttle bucket elevators—the universal conveying means for the cement and lime industry"). These vibrations are also transmitted to the buckets.

When the chain runs onto the drive wheel the chain is also given a lateral jolt, this taking place at the instant at which the flat link chain bushing contacts the drive wheel and then has to follow the circular arc. The mass of the bucket and its contents engages at the center of gravity lying outside the chain and tends to press the lower bushing of the chain link plates inwardly, i.e. in the direction of the chain wheel, whilst the upper bushing is drawn outwardly, i.e. away from the chain wheel. As confirmed in practice the strike marks at the bushings lying below with respect to the bucket are greater than at the bushings lying above with respect to the bucket.

By the striking of the bushing on the chain wheel the chain and buckets are set in vibration. If this vibration is by chance with the inherent frequency of the buckets or close to this frequency destruction of the buckets within a short time is to be expected. It should also be pointed out in this connection that the bracing on securing of the buckets on the chain effects a change of the frequency behaviour. Mostly, there is a frequency displacement to dangerous higher frequencies. The occurrence of sheet metal and weld seam cracks can always be observed in time and in some cases the first cracks appear after only two months; they appear at the latest usually however after one year depending on the bucket design and sheet metal thickness.

When the upper chain bushing has come to bear on the chain wheel, a bending of the chain at the joint must be initiated. Measurements have shown that firstly the static friction must first be overcome by applying a considerably force and this again also leads to vibrations in the chain. By corresponding measurements the bending stress of the chain link plate in the highly loaded eye can be quite clearly detected by increasing of the tension force in the outer link plate portion and reduction thereof in the inner link plate portion.

To avoid sheet metal and weld seam cracks a great number of variations have already been considered of the bucket form, sheet metal thicknesses, material qualities, weld seam thicknesses, beads and reinforcements of the bucket rear walls and tested in fatigue tests. However, all the variations of shape and material fail to provide any appreciable success.

SUMMARY OF THE INVENTION

The present invention is therefore based on the problem of adopting in a flat link chain bucket conveyor of the type set forth at the beginning measures suitable for avoiding the damage to the buckets and bucket mountings resulting from impacts and vibrations transmitted via the chain.

To solve this problem it is provided according to the invention that the buckets are secured to the flat link chain with play in such a manner that at least in the plane along which the chain travels, the buckets are freely movable relatively to the chain under the influence of the forces acting on the buckets within the scope of the existing play. In particular, the buckets are secured via pins formed perpendicularly to the plane of chain travel to said chain with clearance, and for this purpose according to a particularly preferred embodiment the buckets are rigidly connected or connectable to bucket support brackets and the bucket support brackets are mounted via bores whose diameters are greater than the diameter of the link pins on the latter.

Within the scope of the present disclosure "chain plane" is to be interpreted as the plane defined by the plane of the chain wheels and along which the chain travels.

Thus, the present invention is based on the fundamental principle of decoupling the buckets from the flat link chain in such a manner that vibrations and shocks are no longer transmitted from the chain to the buckets, or are transmitted only to a very reduced extent.

The success achieved with the invention has been found to be astonishing in practice because the buckets now practically take on no impacts or vibrations whatever from the chain.

Considering previous experience in practice, this result first appears surprising. If for example the actual highly stressed chain link plates are not pressed with interference fit together with the chain bushings or chain pins, after a short running time they are knocked out under the influence of the high load. In contrast, with the solution according to the invention in which a large movement clearance is present knocking out in particular of the bearing bore of the bucket support brackets hardly occurs. The reason is to be seen in that on each chain link only a single bucket with its load is suspended and nevertheless a large joint area, i.e. minimum surface pressure, is present. In addition, no knocking movement occurs as will be explained hereinafter in detail with the aid of the fundamental illustration described below.

Also of interest is the fact that slight variations in the form and size of the bucket support bracket bore do not have a negative effect on the idea underlying the invention.

If according to the preferred embodiment the bucket support brackets are mounted directly on the chain pins of the flat link chain the invention also provides the following further advantages:

With a rigid bucket screw connection to the chain by the bracing in addition to the normal tensile stressing an additional load is imparted to the chain. In contrast, according to the invention the load of the bucket is introduced directly into the link pins, i.e. at a lowly loaded point of the chain, without affecting the highly loaded chain link plates.

The flat link chain is now made absolutely symmetrically because the bores or flanged angle members necessary in the prior art for securing the buckets can be dispensed with. Since as mentioned above the chain bushings wear to different extents due to striking against the chain wheel, in the case of the present invention compared with the prior art a longer service life of the chain is possible because due to its symmetry the chain can now be turned around.

A further advantage of the arrangement according to the invention is to be seen in that with forged main chain link plates no bores are now necessary for the bucket securing screws and therefore their form may be without any great cross-sectional variations, i.e. in particular smooth. The notch loading at the securing points is eliminated.

It is pointed out that the specific link chain form does not play a decisive part as regards the teaching according to the invention. The chain may for example consist of flat iron link plates with flanged angle portions as illustrated in FIGS. 4, 6 and 7 of the publication mentioned at the beginning. In the same manner forged flat link plates may also be used. The chain may be made up of inner and outer link plates or can be formed by fork chain link plates with bent shape.

As further explained above according to a particularly preferred embodiment the bucket support lugs are mounted on the link pins with clearance via bores dimensioned very large relatively to the link pins. Alternatively, the bucket support brackets can be secured to the chain in that they comprise bearing pins formed perpendicularly to the plane of chain travel which engage with clearance in each case in an axial bore of the link pin.

The bucket support brackets need not necessarily be mounted on the link pins of the chain. According to a further possible embodiment of the invention it is provided that the buckets are mounted with clearance via bucket support brackets on the link plates of the flat link chain. In such an arrangement it is preferably provided that the bearing element on the chain link plate side, in particular either the bearing bore or the bearing pin, lies on the line connecting adjacent link pins. This gives a symmetrical configuration of the chain which makes it possible to turn the chain round and thus obtain a longer service life thereof.

The present invention also relates to a flat link chain for a chain bucket conveyor in which in accordance with the teaching described above the buckets are secured with clearance to the flat link chain, the chain according to the invention being characterized in that the securing points of the buckets to the flat link chain are arranged symmetrically relatively to the chain center line defined by the sequence of the chain link pivot points lying in the plane of chain travel. In particular, the securing points of the buckets may lie at the flat link chain on the center line thereof.

BRIEF DESCRIPTION OF THE DRAWINGS

Several examples of embodiment of the invention will be described hereinafter in detail with the aid of the drawings.

In the drawings:

FIG. 2 is a plan view of a few links of a chain together with the buckets secured thereto, FIG. 3 is a sectional view of the flat link chain and of the bucket along the line 3—3 of FIG. 2.

DETAILED DESCRIPTION OF PREFERRED EMBODIMENT

Figure 1:
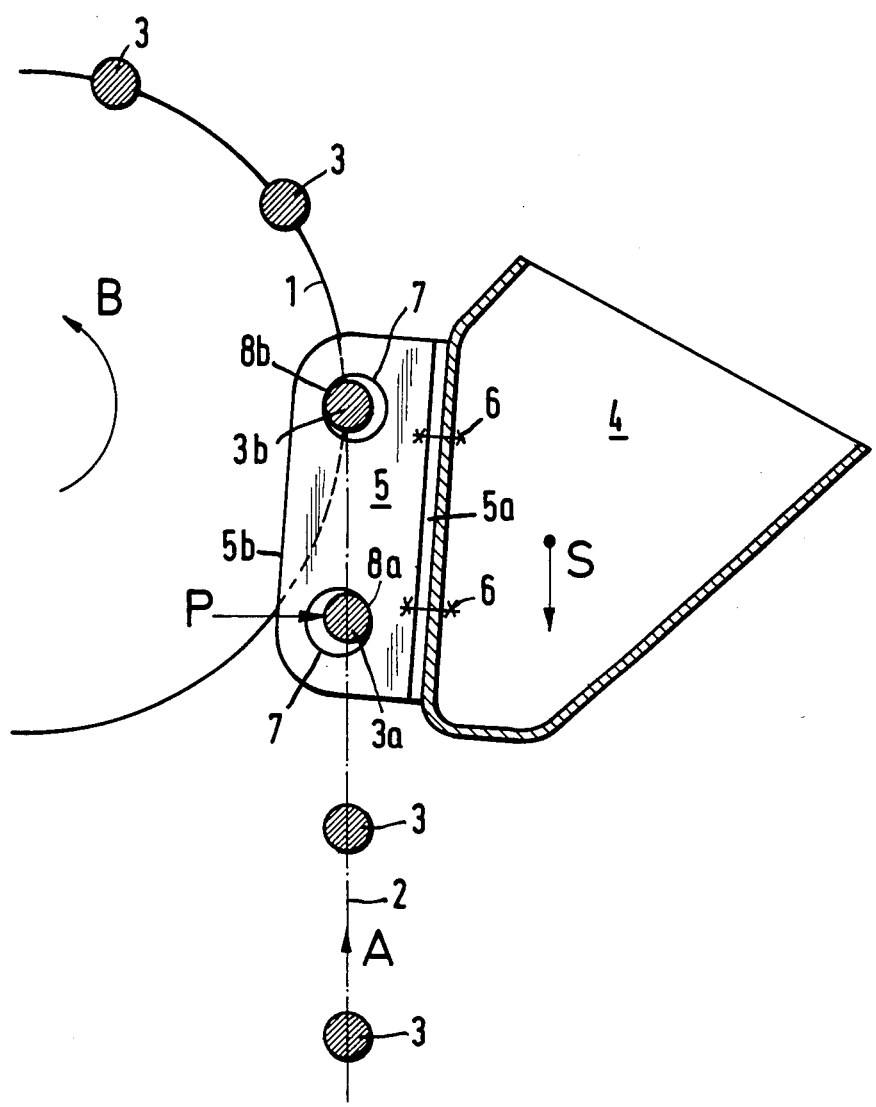
FIG. 1 shows a schematic representation of part of a flat link chain bucket elevator with play mounting of the buckets on the link pins of the flat link chain.

FIG. 1 shows schematically the principle according to the invention of the decoupling of the bucket from the flat link chain. In a bucket conveyor constructed as high-speed conveyor which is known and otherwise not illustrated, in which the material is ejected outwardly by the action of centrifugal force, the flat link chain indicated by the dot-dash line 2 is led over the driven chain wheel 1. The arrow A indicates the running direction of the chain 2, the arrow B the direction of rotation of the chain wheel 1. The reference numerals 3, 3a, 3b refer to successive link pins of the flat link chain 2.

Via suitable connecting elements, for example bolts 6, bucket support brackets 5 made overall angular are rigidly secured to the buckets 4 of the chain 2 and secured with their one leg 5a lying perpendicular to the plane of the drawing according to FIG. 1 in the manner described above to the rear wall of the bucket 4 whilst the leg 5b lying in the plane of the drawing according to FIG. 1 and in the plane of chain travel is secured to the chain 2.

The leg 5b of the bucket support bracket 5 comprises two bores 7 via which the bucket support bracket 5 and thus the bucket 4 is mounted on the link pins 3a, 3b of the flat link chain 2. As apparent from FIG. 1 the diameter of the bores 7 is much greater than the diameter of the link pins 3. The buckets 4 are therefore mounted loosely on the pins 3a, 3b with large clearance. Since the center of gravity S of the bucket 4 together with the bucket support bracket 5 lies outside the chain substantially at the point illustrated in FIG. 1, the pins 3b, 3a lie on the bores 7 at a point 8a, 8b displaced to the left or right by a certain angular amount from the vertical. When now the force P applied by the chain wheel 1 occurs at the instant when the chain bushing runs onto the chain wheel, the bore 7 is caused to attempt a rotational movement on the link pin 8a and this results in a strong damping effect. Measurements made by Applicants have shown that the amplitude of the stimulated bucket oscillation is only very small compared with the rigid mounting of the bucket. In addition, the vibration has already decayed after about 10% of the time required with a rigid bucket mounting.

Figure 4:
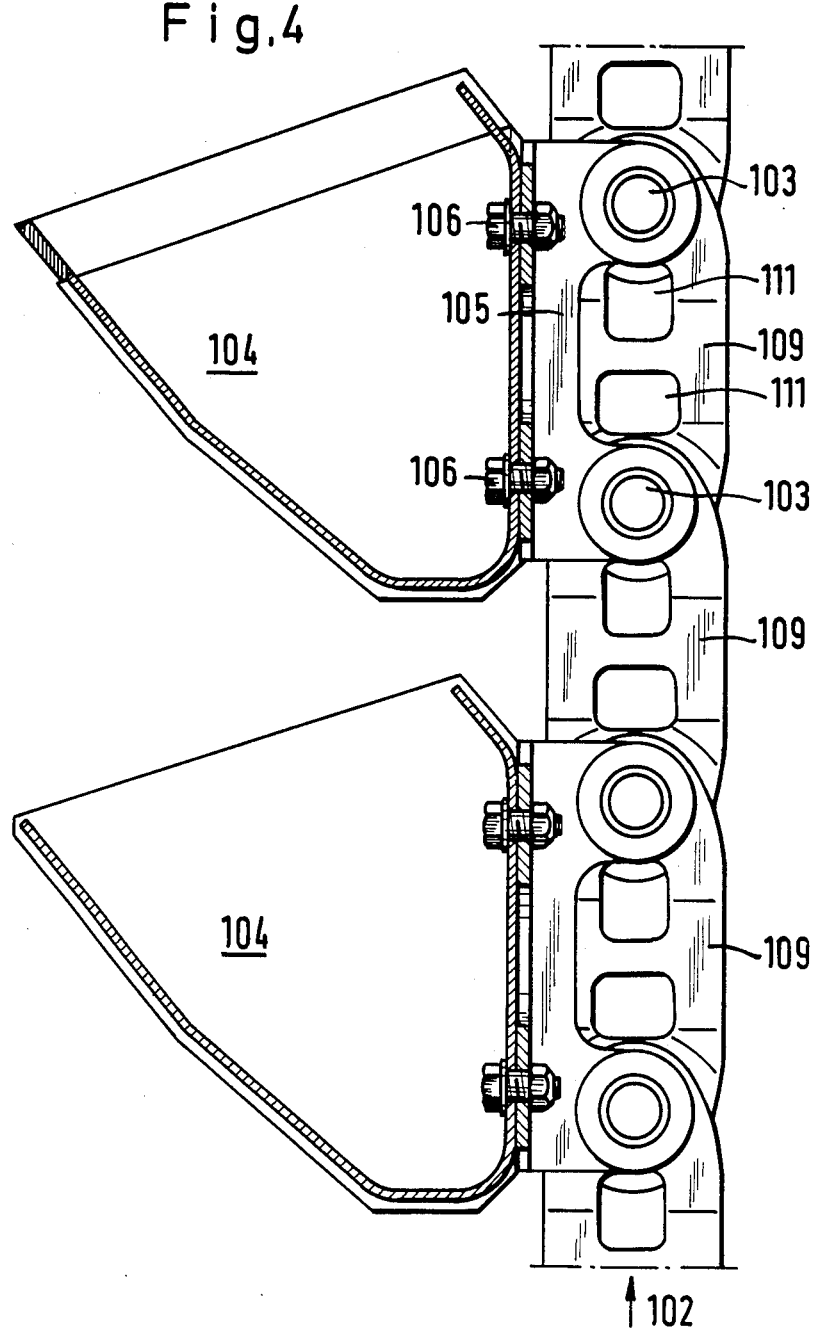
FIG. 4 is a partially sectioned view along the line 4—4 of FIG. 2.
Figure 5:
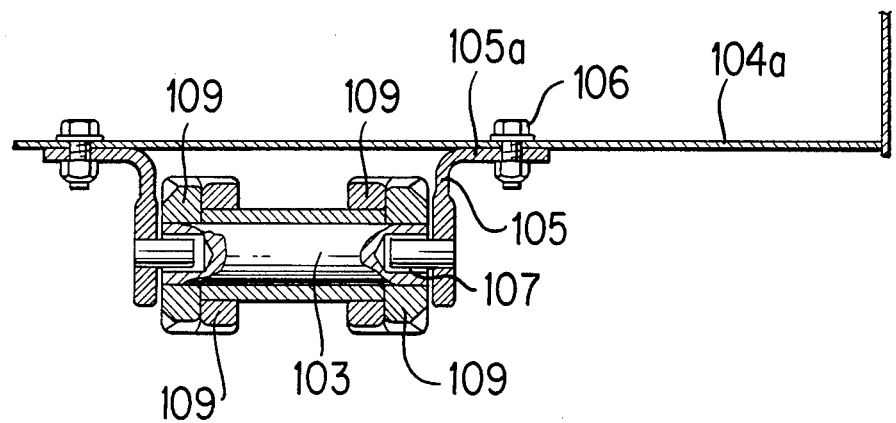
FIG. 5 is a view, in section and partly broken away, showing another embodiment of the invention.
Figure 6:
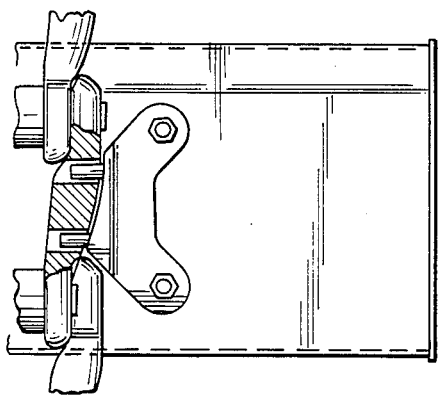
FIG. 6 is a view, partly in section and partly broken away, showing a further embodiment of the invention.

FIGS. 2 to 4 show in detail a particularly preferred embodiment of the invention.

In this embodiment, the chain link plates 109 are constructed as fork chain link plates in bent form but could equally well be constructed for example as flat iron link plates with inner and outer plates. As apparent in particular from FIG. 3 the link pins 103 are extended at both their ends in the axial direction so that they may serve as bearings for the bucket support brackets 105. As in the case of the embodiment according to FIG. 1 the bucket support brackets 105 are formed as angle members, the angle legs 105a being rigidly secured via screws and nuts 106 to the rear wall 104a of the bucket 4. The pins 103 have a diameter of 40 mm and the bores 107 via which the bucket support brackets 105 and thus the buckets 104 are held on the pins 103 and thus on the chain have a diameter of 41 mm.

Generally speaking, the pins 103 have a diameter which depends on the particular chain size necessary, i.e. on load criteria such as conveying power, lifting height, etc.

However, of greater significance is the difference between the pin diameter and the bore of the bucket support brackets. The criteria governing the magnitude of the play are: magnitude of the bucket mass, conveying speed, chain wheel diameter and thus influence of the polygon effect with the resulting impacts.

According to a further example of embodiment which is not illustrated the preferred example of embodiment according to FIGS. 2 to 4 is modified in that the bucket support brackets 105 are secured to the link pins 103 in that the bucket support brackets 105 have inwardly directed bearing pins which engage in corresponding axial bores in the link pins 103.

According to a further embodiment which is likewise not illustrated the bucket support brackets are not mounted on the link pins but on the chain link plates, for example in the region of the openings 111 according to FIG. 4, the securing to the chain link plates preferably being made along the chain center line to permit the chain to be turned around.

I claim:

1. A high-speed flat link chain bucket conveyor constructed for centrifugal discharging, comprising a flat link chain and buckets mounted on said chain, one bucket after the other, each bucket being secured to the opposite ends of a link of said flat link chain, independent of the other buckets and the other links of said chain, by bucket securing means, characterized in that each of said securing means is fixedly secured to said bucket and is secured to said opposite ends of said link of said flat link chain in the path of travel of said links of said chain and independent of other chain links in said chain with play between each of said securing means and said opposite ends of said link to which said securing means is secured such that at least in the path of travel of said flat link chain said buckets and said securing means fixedly secured to said bucket are movable relative to said chain when the direction of forces applied to said bucket by said flat link chain in said path of travel is changed.

2. A flat link chain bucket conveyor according to claim 1, further characterized in that said bucket securing means are secured to the flat link chain with play via pins formed perpendicularly to said plane and said play is provided by a clearance between said pins and said securing means.

3. A flat link chain bucket conveyor according to claim 2, further characterized in that the boundary faces defining the clearance are circular in the sectional plane of the chain plane.

4. A flat link chain bucket conveyor according to claim 3, further characterized in that said securing means are mounted with play on the link pins of the chain and comprise bucket support brackets rigidly connected to the buckets.

5. A flat link chain bucket conveyor according to claim 4, further characterized in that the bucket support brackets are mounted on the link pins via bores whose diameter is greater than the diameter of the link pins.

6. A flat link chain bucket conveyor according to claim 4, further characterized in that the bucket support brackets have bearing pins which are formed perpendicularly to said plane and which each engage with clearance in an axial bore in the link pin.

7. A flat link chain bucket conveyor according to claim 3, further characterized in that said securing means are mounted with play on the chain link plates of the chain and comprise bucket support brackets rigidly connected to the buckets.

8. A flat link chain bucket conveyor according to claim 7, further characterized in that said securing means are secured with play at bearing element adjacent link pins.

9. A flat link chain bucket conveyor according to any one of claims 1 to 8, inclusive, further characterized in that the play is 0.2 to 10 mm.

10. A flat link chain for a flat link chain bucket conveyor according to claim 2, further characterized in that said conveyor comprises parallel flat link chains which travel in parallel travel paths and the securing points of said securing means and the parallel flat link chains are disposed symmetrically with respect to a center line of the chain defined by said paths.

11. A flat link chain according to claim 10, further characterized in that the securing points of said securing means to the flat link chain lie on the chain center line.

12. A flat link chain bucket conveyor according to any one of claims 1 to 8, inclusive, further characterized in that the play is 1 to 5 mm.

* * * * *